Figure 3:
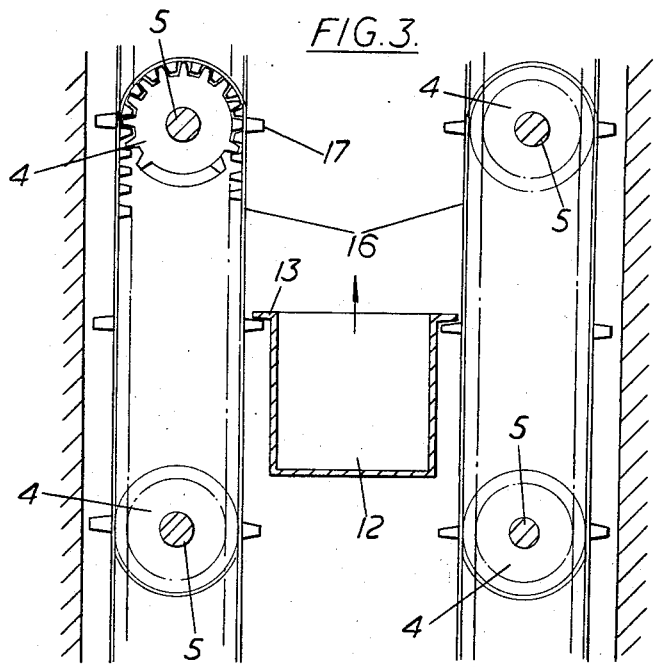

Nov. 30, 1965  F. NIXON  3,220,537
ELEVATING APPARATUS HAVING INVOLUTE SHAPED DRIVING LUGS
Filed April 27, 1964  5 Sheets-Sheet 1
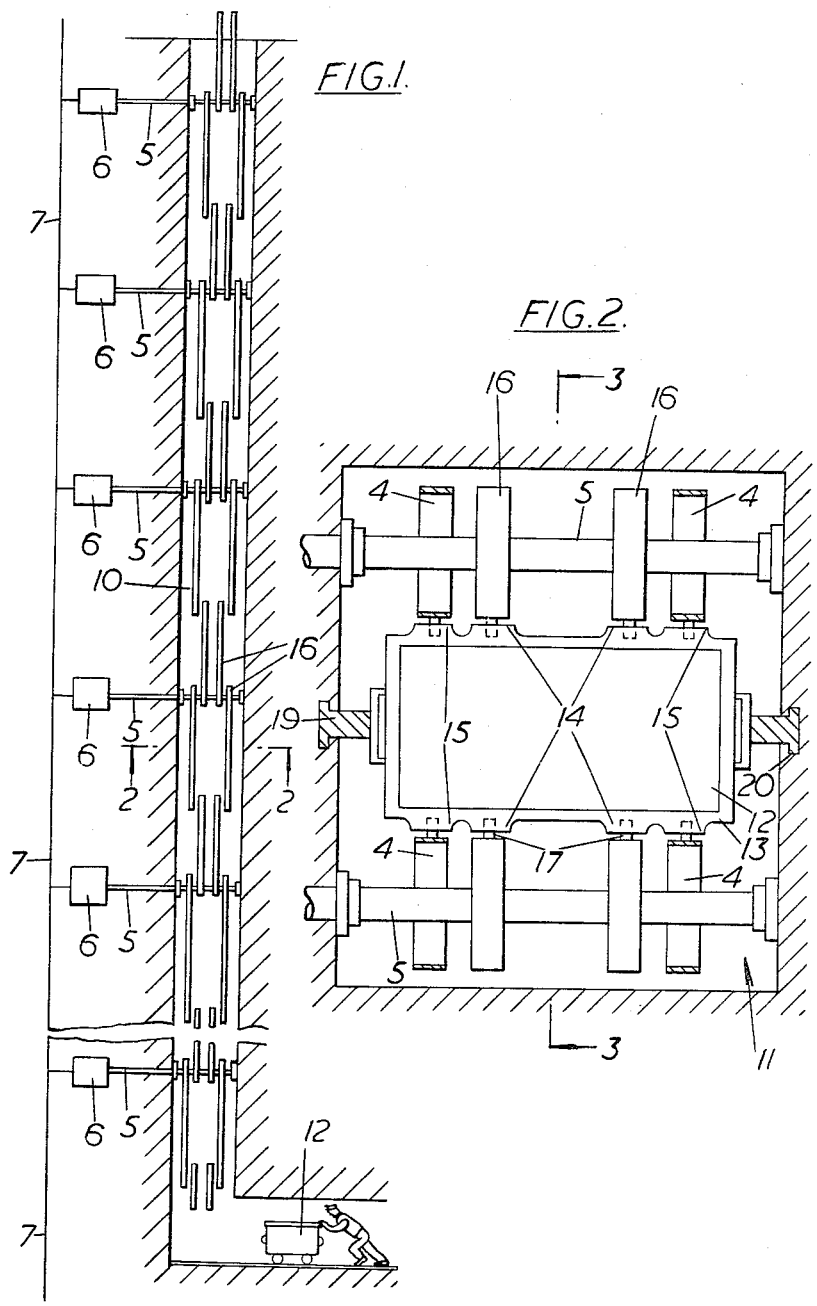
Inventor
FRANK NIXON
By
Cushman, Darby & Cushman
Attorneys Nov. 30, 1965  F. NIXON  3,220,537
ELEVATING APPARATUS HAVING INVOLUTE SHAPED DRIVING LUGS
Filed April 27, 1964  5 Sheets-Sheet 2

Inventor
FRANK NIXON
By Cushman, Darby & Cushman
Attorneys

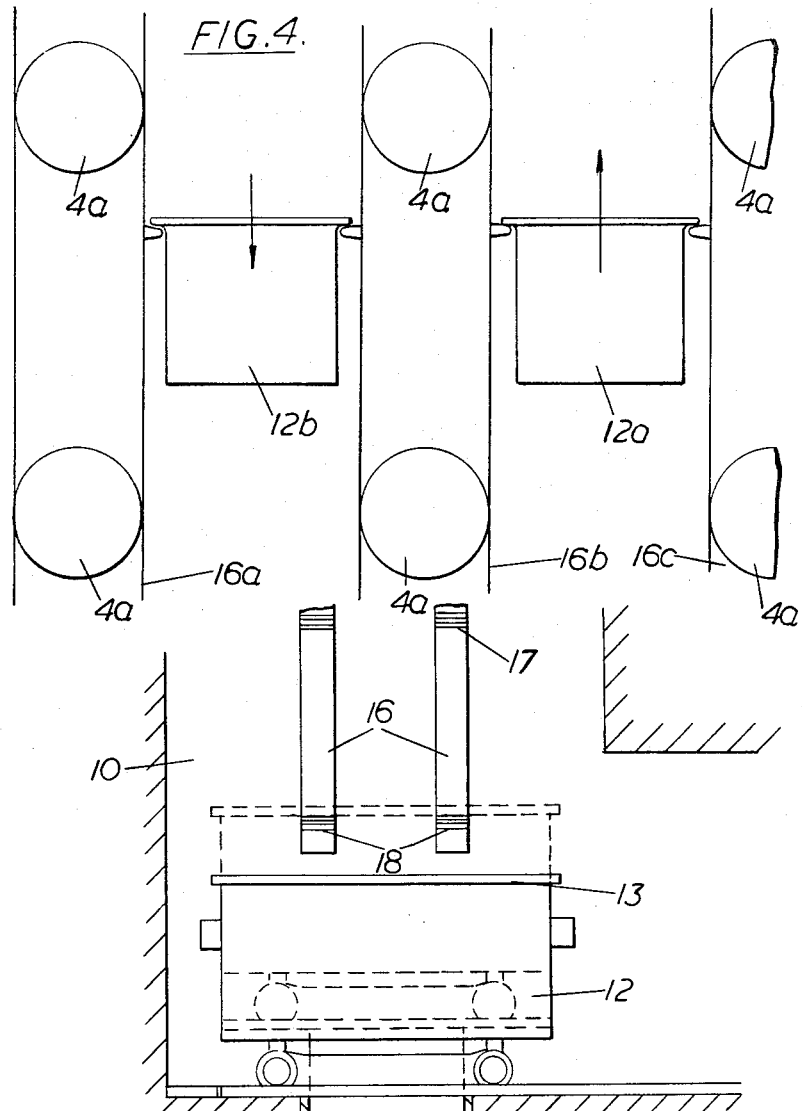

Nov. 30, 1965 F. NIXON 3,220,537
ELEVATING APPARATUS HAVING INVOLUTE SHAPED DRIVING LUGS
Filed April 27, 1964 5 Sheets-Sheet 4
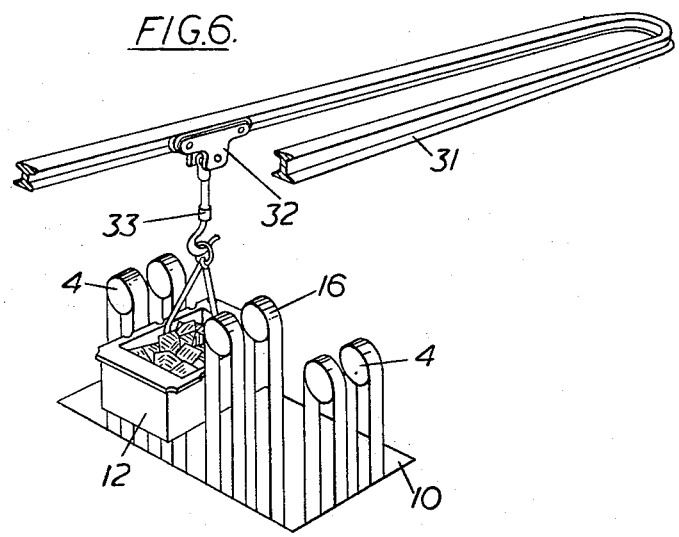
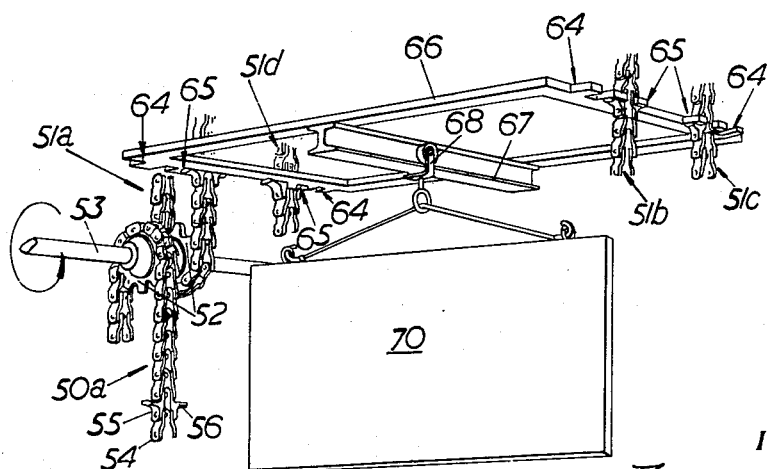
Inventor
FRANK NIXON
By Cushman, Darby & Cushman
Attorneys Nov. 30, 1965  F. NIXON  3,220,537
ELEVATING APPARATUS HAVING INVOLUTE SHAPED DRIVING LUGS
Filed April 27, 1964  5 Sheets-Sheet 5
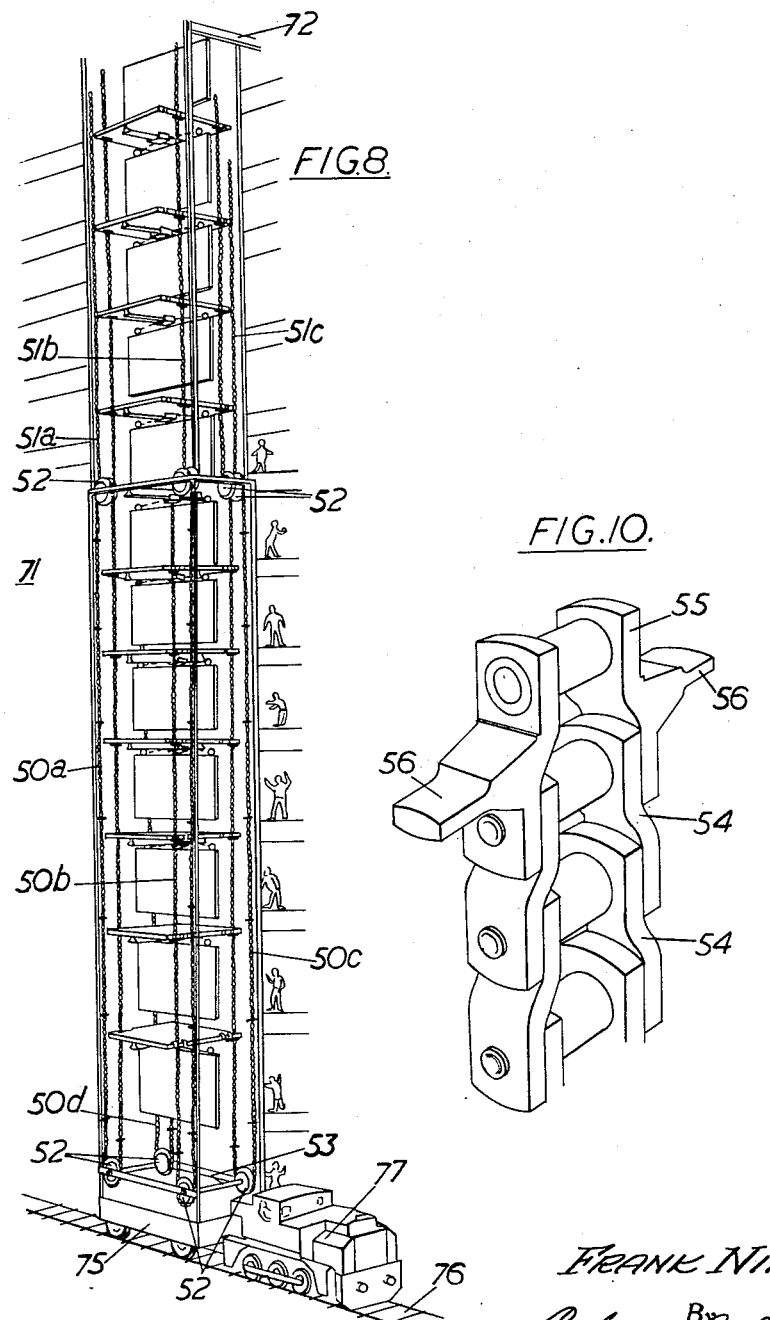
Inventor
FRANK NIXON
By Cushman, Darby & Cushman
Attorneys ns
3,220,537
ELEVATING APPARATUS HAVING INVOLUTE SHAPED DRIVING LUGS
Frank Nixon, Duffield, England, assignor to Rolls-Royce Limited, Derby, England, a company of Great Britain
Filed Apr. 27, 1964, Ser. No. 362,583
Claims priority, application Great Britain, May 3, 1963, 17,689/63
13 Claims. (Cl. 198—163)

This invention concerns conveyor apparatus.

According to the present invention, there is provided conveyor apparatus for effecting vertical movement of members comprising a series of endless conveyors which are arranged sequentially one above the other and each of which is provided with engagement means for engaging abutment means on the members, and means for driving the endless conveyors, the movement of the endless conveyors being so synchronised and their engagement means being so disposed that a member to be moved vertically, on reaching an end of one endless conveyor, has its abutment means disengaged from the engagement means on the said one endless conveyor and engaged by the engagement means of the next adjacent endless conveyor.

There may be a common drive for all the endless conveyors. Thus the apparatus, may, for example, comprise a vertical drive shaft which is drivingly connected to each of the endless conveyors. The vertical drive shaft, which may have a driving motor at one end, may have a gear or a chain and sprocket drive to each of the endless conveyors.

Alternatively, and preferably, separate motors are provided for driving the endless conveyors.

The said engagement means may be constituted by teeth of involute form on the endless conveyors. Alternatively, the endless conveyors may be chains formed of interconnected limbs, said engaged means being constituted by flanges integral with some of the links forming said chains.

Means may be provided for supporting the endless conveyors against sideways loading. Thus vertically extending rubbing strips may be provided, the endless conveyors abutting against the rubbing strips so that any sideways loading is cushioned. Alternatively, the endless conveyors may be provided with rollers which are mounted on the axes about which the endless conveyors are entrained, the rollers abutting against vertically extending rubbing strips or being contained in vertically extending running channels.

Preferably there are a plurality of series of endless conveyors which are so arranged that a member has its abutment means simultaneously engaged by a number of endless conveyors throughout the time it is being moved vertically.

The said plurality preferably comprises endless conveyors which are arranged to engage abutment means on opposite sides of the members.

The apparatus is preferably constructed to permit the endless conveyors to carry one or more members downwardly at the same time as they are carrying one or more members upwardly.

Thus there may be at least three series of endless conveyors one of which is disposed midway between the other two, whereby a member to be hoisted may be carried by one run of the said midway series and by one of the outer series, while a member to be lowered may simultaneously be carried by the other run of the said midway series and by the other outer series.

The apparatus may also comprise means for lifting a member into a position in which its abutment means is automatically engaged by the engagement means of the lowermost endless conveyor or conveyors.

Additionally, there may be provided a horizontally extending track mounted above the said series of endless conveyors, and at least one carriage which is mounted for movement along said track and which is provided with means for engaging a member which has reached the top of the said series.

The invention also comprises apparatus as set forth above when installed in a vertical shaft, oppositely disposed walls of the shaft being formed with guide portions which are engageable by containers constituting the members, or means connected thereto, so as to steady the containers during their movement through said shaft.

Additionally, the invention comprises apparatus as set forth above in combination with trucks, tubs or containers which constitute the said members.

The invention is illustrated, merely by way of example, in the accompanying drawings, in which:

FIGURE 1 is a diagrammatic sectional view of a vertical shaft in which is installed a conveyor apparatus according to the present invention, FIGURES 2 and 3 are sections taken respectively on the lines 2—2 of FIGURE 1 and 3—3 of FIGURE 2, FIGURE 4 diagrammatically illustrates a conveyor apparatus by means of which one set of tubs may be hoisted up while another set of tubs are being lowered.

Figure 7:
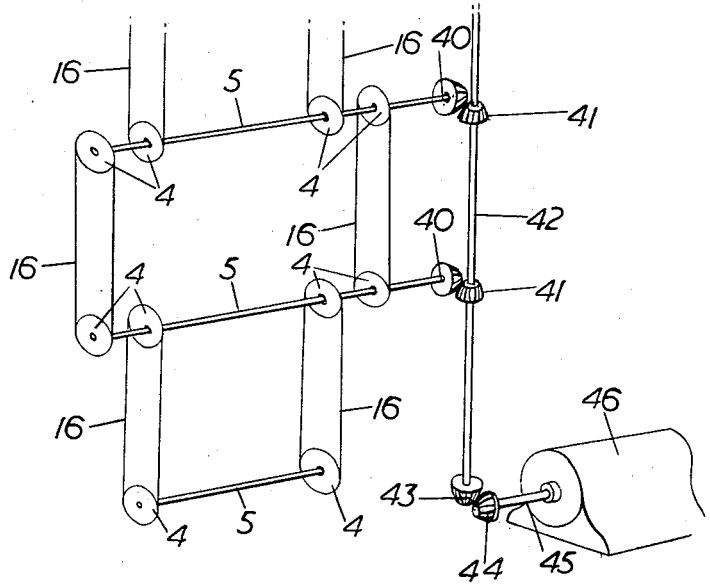

FIGURE 5 is a sectional view showing apparatus which may be employed at the bottom of the said vertical shaft to lift a truck into a position in which it may be engaged by the said endless conveyors, FIGURE 6 is a broken away perspective view of apparatus which may be installed at the top of the said vertical shaft to move the trucks horizontally away therefrom, FIGURE 7 is a diagrammatic illustration of alternative apparatus for driving the conveyor apparatus according to the present invention, FIGURE 8 is a general view of a further conveyor apparatus in accordance with the present invention in use in the construction of a building, FIGURE 9 is a general detailed view of part of the apparatus of FIGURE 8 and FIGURE 10 is a general detailed view of part of an endless conveyor of FIGURES 8 and 9.

Referring to FIGURES 1 to 6 of the drawings, a vertical shaft 10 of a coal mine has installed therein a conveyor apparatus 11 by means of which trucks 12 (or tubs 12 mounted on detachable bogies) may be hoisted from the bottom to the top of the vertical shaft 10, the trucks or tubs 12 having been filled with coal. Each truck 12 has, at its upper end, an outwardly extending peripheral flange 13 of involute form, the flange 13 having four enlarged portions 14 and four enlarged portions 15 which are arranged outwardly of the portions 14.

The conveyor apparatus 11 comprises four series of endless chain conveyors 16, each such series comprising endless conveyors 16 which are arranged sequentially one above the other. The conveyors 16 rotate about end wheels 4, adjacent end wheels 4 being mounted on common shafts 5. In the embodiment shown in FIGURES 1 to 3, four end wheels 4 are mounted on each common shaft 5. Each common shaft 5 is driven by a separate motor 6. All the motors 6 are connected to a common control circuit 7 by means of which the motors are synchronised.

The four series of endless conveyors 16 are so arranged that when, as shown in FIGURE 2, a tub 12 is being hoisted, one pair of endless conveyors are disposed on one side of the tub 12 and another pair of endless conveyors are disposed on the opposite side of the tub 12.

Each of the endless conveyors 16 is provided at spaced intervals with teeth 17 of involute form, each tooth 17 being engageable beneath a portion 14 or 15 of the flange 13 on a tub 12.

As will be seen from FIGURES 1 and 2, the endless conveyors 16 are arranged in alternating sets, the teeth 17 of one set engaging the portions 14 and the teeth 17 of the next set engaging the portions 15.

The movement of the endless conveyors 16 is so synchronised and the teeth 17 are so disposed that, when a tub 12 has been raised to the upper ends of one set of endless conveyors 16, the teeth 17 of the said set will become disengaged from, say, the portions 14 at the same time as the teeth 17 of the next adjacent set will become engaged with the portions 15.

The involute form of the teeth 17 and the portions 14, 15 engaged thereby allows smooth continuous transfer of the tubs 12 between adjacent endless conveyors 16.

A tub 12, which has been engaged with the teeth 17 on the set of endless conveyors 16 at the bottom of the vertical shaft 10, will therefore be hoisted to the top of the shaft 10 by being automatically transferred from one set of endless conveyors 16 to the next adjacent set.

Two wooden blocks 19 are disposed in guide portions 20 of oppositely disposed walls of the vertical shaft 10. The blocks 19 serve to steady the tubs 12 during their ascent through the vertical shaft 10 by abutting opposite ends of the tubs 12.

As will be appreciated, since the length of each endless conveyor 16 may be kept short, it is not necessary to employ powerful motors to drive the endless conveyors 16.

FIGURE 4 illustrates diagrammatically a conveyor apparatus comprising three series of endless conveyors 16a, 16b, 16c of which the endless conveyors 16b are arranged midway between the outer endless conveyors 16a, 16c. A tub 12a to be hoisted may thus be carried by one run of each of the endless conveyors 16b and by the endless conveyors 16c, while a tub 12b to be lowered may simultaneously be carried by the other run of each of the endless conveyors 16b and by the endless conveyors 16a.

In FIGURE 5 there is shown a piston 26 which is slidably mounted in a cylinder 27 disposed at the bottom of the vertical shaft 10. The piston 26, which may be reciprocated by a crank 30, is engageable with the bottom of a truck 12. The piston 26 may be moved by the crank 30 so as to raise the truck 12 to a position (shown in dotted lines in FIGURE 5) in which the teeth 17 on the lowermost endless conveyors 16 will automatically engage the flange 13.

Alternatively the crank 30 may be dispensed with and a spring (not shown) may be mounted within the piston 26. In this case, the arrangement may be such that the truck 12 drops onto the piston 26 so as to compress the spring which then expands so as to carry the truck 12 upwardly to a position in which its flange 13 will be engaged by the teeth 17 on the lowermost endless conveyors 16.

In FIGURE 6 there is shown a horizontally extending track 31 which is mounted above the endless conveyors 16. Carriages 32 (only one shown) are mounted for movement along the track 31, each carriage 32 being provided with tackle 33 for engaging a truck 12 which has reached the top of the vertical shaft 10. The carriages 32 may be moved horizontally along the track 31 to a point (not shown) at which the coal may be unloaded from the trucks 12.

Referring now to FIGURE 7, there is shown an alternative drive for the conveyor apparatus of FIGURES 1 to 6. In this arrangement each shaft 5 is provided at one end with a bevel gear 40 which meshes with a bevel gear 41 on a drive shaft 42. Drive shaft 42 extends vertically within shaft 10 and is provided at its lower end with a bevel gear 43 which meshes with a further bevel gear 44 provided on an output shaft 45 of a motor 46. Thus motor 46 drives all shafts 5 through shaft 42, and all conveyors 16 are thus synchronised.

Referring to FIGURES 8 to 10, there is shown an alternative embodiment of conveyor apparatus according to the present invention. The apparatus consists of eight continuous conveyors 50a, b, c and d and 51a, b, c and d. Each conveyor is adapted to rotate about cog wheels 52 mounted on axles 53. Each axle is driven by a motor (not shown), the motors being synchronised.

Each conveyor consists, as shown in FIGURE 9, and most clearly shown in FIGURE 10, of a chain composed of a series of pivotally connected links 54, 55. Links 55 differ from links 54 in that they are provided with integral flanges 56 which project from either side thereof.

The pairs of flanges 56 are adapted to contact a portion 64 or 65 of a supporting frame 66 which is adapted to be lifted vertically by the conveyor apparatus. As seen in FIGURE 9, supporting frame 66 has portions 64 outermost and portion 65 innermost. Portions 64 are adapted to be contacted by flanges 56 of conveyors 50a–d and portions 65 are adapted to be contacted by flanges 56 of conveyors 51a–d. The conveyors 50, 51 are so synchronised that the supporting frames 66 are conveyed up the conveyor apparatus continuously, being passed from conveyors 50 to conveyors 51 without stopping.

The supporting frames 66 may take any form being adapted to the particular use for which they are required e.g. a plain supporting platform may be used. The particular form shown in FIGURES 8 and 9 comprises a rolled steel joist 67, having a carriage 68 movable thereover and adapted to support pre-cast concrete slabs 70 which are used in constructing the building 71 shown in FIGURE 8.

The conveyor apparatus shown in FIGURE 8 is provided at its upper end with horizontally extending booms 72 which provide guides onto which the supporting frames may be swung when they reach the top of the conveyor apparatus.

The conveyor apparatus illustrated is mobile, being supported at its lower end on a track 75 adapted to be moved along a track 76 by a locomotive 77. However, the apparatus need not be mobile and could, for example, be fixed to the ground and rigidly attached to the building structure for additional support.

The conveyor apparatus of FIGURES 8 to 10 need not be provided with separate motors but could of course be provided with a common motor along the lines indicated in FIGURE 7.

I claim:
1. Conveying apparatus for effecting vertical movement of members, comprising a series of endless conveyors which are arranged sequentially one above the other, teeth having involute form on each conveyor for engaging abutment means on the members, and common drive means for driving the endless conveyors and for synchronising their movement, the said drive means ensuring that a member being moved vertically, on reaching an end of one endless conveyor, has its abutment means disengaged from the teeth on the said one endless conveyor and engaged by the teeth of the next adjacent endless conveyor.

2. Conveying apparatus for effecting vertical movement of members, comprising a series of endless conveyors which are arranged sequentially one above the other, teeth having involute form on each conveyor for engaging abutment means on the members and common drive means including a vertical drive shaft which is drivingly connected to each of the endless conveyors and which synchronises their movement, the said drive means ensuring that a member being moved vertically, on reaching an end of one endless conveyor, has its abutment means disengaged from the teeth on the said one endless conveyor and engaged by the teeth of the next adjacent endless conveyor.

3. Conveying apparatus for effecting vertical movement of members, comprising a series of endless conveyors which are arranged sequentially one above the other, teeth having involute form on each conveyor for engaging abutment means on the members, and drive means comprising separate motors drivingly connected to the endless conveyors and means for synchronising rotation of said motors, the said drive means ensuring that a member being moved vertically, on reaching an end of one endless conveyor, has its abutment means disengaged from the teeth on the said one endless conveyor and engaged by the teeth of the next adjacent endless conveyor.

4. Conveying apparatus for effecting vertical movement of members, comprising a series of endless conveyors which are arranged sequentially one above the other, teeth having involute form on each conveyor for engaging abutment means on the members, and drive means for driving the endless conveyors and for synchronising their movement, the said drive means ensuring that a member being moved vertically, on reaching an end of one endless conveyor, has its abutment means disengaged from the teeth on the said one endless conveyor and engaged by the teeth of the next adjacent endless conveyor.

5. Conveying apparatus for effecting vertical movement of members, comprising a series of endless chains formed of interconnected links, said chains being arranged sequentially one above the other, teeth having involute form on each chain for engaging abutment means on the members, and drive means for driving the endless chains and for synchronising their movement, the said drive means ensuring that a member being moved vertically, on reaching an end of one endless chain, has its abutment means disengaged from the teeth on the said one endless chain and engaged by the teeth of the next adjacent endless chain.

6. Conveying apparatus for effecting vertical movement of members, comprising a series of endless chains formed of interconnected links, said chains being arranged sequentially one above the other, flanges having involute form integral with some of the links forming each chain for engaging abutments means on the members, and drive means for driving the endless members and for synchronising their movement, the said drive means ensuring that a member being moved vertically, on reaching an end of one endless chain, has its abutment means disengaged from the flanges on the said one endless chain and engaged by the flanges of the next adjacent endless chain.

7. Conveying apparatus for effecting vertical movement of members, comprising a series of endless conveyors which are arranged sequentially one above the other, having involute form on each conveyor for engaging abutment means on the members, drive means for driving the endless conveyors and for synchronizing their movement, the said drive means ensuring that a member being moved vertically, on reaching an end of one endless conveyor, has its abutment means disengaged from the teeth on the said one endless conveyor and engaged by the teeth of the next adjacent endless conveyor, and means for supporting the endless conveyors against sideways loading.

8. Conveying apparatus for effecting vertical movement of members, comprising a plurality of series of endless conveyors which are arranged sequentially one above the other, teeth having involute form on each conveyor for engaging abutment means on the members, and drive means for driving the endless conveyors and for synchronising their movement, the said drive means ensuring that a member being moved vertically, on reaching an end of one endless conveyor, has its abutment means disengaged from the teeth on the said one endless conveyor and engaged by the teeth of the next adjacent endless conveyor, the teeth of a number of endless conveyors simultaneously engaging the abutment means of a member throughout the time it is being moved vertically.

9. Conveying apparatus for effecting vertical movement downwardly of at least one member at the same time as it is effecting vertical movement upwardly of at least one member, comprising a series of endless conveyors which are arranged sequentially one above the other, teeth having involute form on each conveyor for engaging abutment means on the members, and drive means for driving the endless conveyors and for synchronising their movement, the said drive means ensuring that a member being moved vertically, on reaching an end of one endless conveyor, has its abutment means disengaged from the teeth on the said one endless conveyor and engaged by the teeth of the next adjacent endless conveyor.

10. Apparatus as claimed in claim 9 in which there are at least three series of endless conveyors one of which is disposed midway between the other two, whereby a member to be hoisted may be carried by one run of the said midway series and by one of the outer series, while a member to be lowered may simultaneously be carried by the other run of the said midway series and by the other outer series.

11. Conveying apparatus for effecting vertical movement of members comprising a series of endless conveyors which are arranged sequentially one above the other, teeth having involute form on each conveyor for engaging abutment means on the members, drive means for driving the endless conveyors and for synchronising their movement, the said drive means ensuring that a member being moved vertically, on reaching an end of one endless conveyor, has its abutment means disengaged from the teeth on the said one endless conveyor and engaged by the teeth of the next adjacent endless conveyor, and means for lifting a member into position in which its abutment means is automatically engaged by the teeth of the lowermost endless conveyor or conveyors.

12. Conveying apparatus for effecting vertical movement of members, comprising a series of endless conveyors which are arranged sequentially one above the other, engagement means on each conveyor for engaging abutment means on the members, drive means for driving the endless conveyors and for synchronising their movement, the said drive means ensuring that a member being moved vertically, on reaching an end of one endless conveyor, has its abutment means disengaged from the engagement means on the said one endless conveyor and engaged by the engagement means of the next adjacent endless conveyor, a horizontally extending track mounted above the series of endless conveyors, and at least one carriage which is mounted for movement along said track and which is provided with means for engaging a member which has reached the top of said series.

13. An installation disposed within a vertical shaft comprising conveying apparatus for effecting vertical movement of containers, said conveying apparatus comprising a series of endless conveyors which are arranged sequentially one above the other, engagement means on each conveyor for engaging abutment means on the containers, drive means for driving the endless conveyors and for synchronising their movement, the said drive means ensuring that a container being moved vertically, on reaching an end of one endless conveyor, has its abutment means disengaged from the engagement means on the said one endless conveyor and engaged by the engagement means of the next adjacent endless conveyor, and guide portions formed on oppositely disposed sides of the shaft, said guide portions being engageable by said containers so as to steady the containers during their movement through the shaft.

References Cited by the Examiner
UNITED STATES PATENTS

| | | | |
|---|---|---|---|
| 1,195,507 | 8/1916 | Schaefer | 198—84 X |
| 1,504,886 | 8/1924 | Gibbs | 198—163 |
| 1,517,707 | 12/1924 | Castleman. | |
| 2,888,129 | 5/1959 | Chapman | 198—82 |
| 2,951,577 | 9/1960 | Wilcoxen | 198—82 |
| 3,071,237 | 1/1963 | Powell | 198—102 X |

SAMUEL F. COLEMAN, *Primary Examiner.*